United States Patent
Lyles, III

(10) Patent No.: US 7,241,390 B2
(45) Date of Patent: Jul. 10, 2007

(54) METHOD AND SYSTEM FOR BIOLOGIC DECONTAMINATION OF A VESSEL'S BALLAST WATER

(75) Inventor: Robert Lyles, III, Edgewater, MD (US)

(73) Assignee: Amergin, LLC, Bowie, MD (US)

( * ) Notice: Subject to any disclaimer, the term of this patent is extended or adjusted under 35 U.S.C. 154(b) by 306 days.

(21) Appl. No.: 10/926,610

(22) Filed: Aug. 25, 2004

(65) Prior Publication Data

US 2007/0125717 A1    Jun. 7, 2007

Related U.S. Application Data

(60) Provisional application No. 60/499,248, filed on Aug. 29, 2003.

(51) Int. Cl.
*C02F 1/76* (2006.01)

(52) U.S. Cl. ............ 210/748; 210/754; 210/764; 210/767; 210/192; 210/198.1; 205/341; 205/556; 205/742; 205/751; 205/758; 204/269; 204/276

(58) Field of Classification Search ............ 210/748, 210/754, 192, 198.1, 764, 767; 205/341, 205/556, 742, 751, 758; 204/267, 269, 276
See application file for complete search history.

(56) References Cited

U.S. PATENT DOCUMENTS

| 3,458,414 A | * | 7/1969 | Crane et al. ............ 210/746 |
| 3,774,246 A | * | 11/1973 | Beer ............ 4/227.1 |
| 4,292,175 A | | 9/1981 | Krause et al. |
| 4,384,943 A | | 5/1983 | Stoner et al. |
| 5,804,065 A | | 9/1998 | Kolz |
| 5,816,181 A | | 10/1998 | Sherman, Jr. |
| 5,871,623 A | | 2/1999 | Bakhir et al. |
| 5,932,112 A | | 8/1999 | Browning, Jr. |
| 6,217,741 B1 | | 4/2001 | Doi |
| 6,773,611 B2 | * | 8/2004 | Perlich et al. ............ 210/758 |
| 2002/0189954 A1 | | 12/2002 | Miyazaki et al. |
| 2003/0029811 A1 | | 2/2003 | Russell |

FOREIGN PATENT DOCUMENTS

| FR | 2404605 A1 | 4/1979 |
| GB | 1539521 A1 | 1/1979 |
| GB | 2113718 A1 | 8/1983 |
| JP | 04322788 A * | 11/1992 |

OTHER PUBLICATIONS

English Language Translation of JP 04322788A.*
Electrichlor, "Ballast Water Treatment", Online, Aug. 2002, pp. 1-9, retrieved from the Internet on Nov. 11, 2004: URL:http://www.socp.org/ballast/papers/electrichlor.pdf.

* cited by examiner

*Primary Examiner*—Matthew O. Savage
(74) *Attorney, Agent, or Firm*—Foley & Lardner LLP

(57) ABSTRACT

A system for elimination of unwanted species from contaminated ship ballast water. The apparatus comprises an electrolytic cell containing at least one pair of electrodes, electric alternating current, and parallel perforated electrodes, for providing an effective and safe method to render ballast water or other conductive bodies of water free of aquatic invasive species and/or unwanted biologics.

19 Claims, 3 Drawing Sheets

METHOD AND SYSTEM FOR BIOLOGIC DECONTAMINATION OF A VESSEL'S BALLAST WATER

CROSS-REFERENCE TO RELATED PATENT APPLICATIONS

This application is an application claiming the benefit under 35 USC 119(e) U.S. Patent Application No. 60/499,248, filed Aug. 29, 2003, incorporated herein by reference in its entirety.

BACKGROUND OF THE INVENTION

This invention relates to a method for controlling the introduction of aquatic invasive species to a new habitat by means of a vessel's ballast water. More particularly, the present invention relates to methods and apparatus for electrochemical disinfection of ballast water.

The worldwide transfer and introduction of non-indigenous species by human activities is having significant and unwanted ecological, economic, and human-health impacts. Over the last decade, studies have found that ballast water has transported invasive marine species from their indigenous habitats, and far beyond the natural spread of the respective species. Organisms ranging from microscopic viruses to shellfish and aquatic plant life have been introduced into many U.S. waterways and ports. Each year more than 79 million metric tons of ballast water is released in the United States.

The past decade has seen extensive research of a handful of ballast water treatment options and similar levels of research have been devoted to charting the spread of AIS throughout the coastal and inland waterways of the United States. Disinfection of ballast water has not been achieved to date and current practices of ballast water management have been proven to be non-effective. The only existing mitigation option is mid-ocean ballast water exchange. Ballast water exchange is difficult to quantify in practice, cannot be safely performed on all transoceanic voyages, and by current definition cannot be conducted on voyages that take place within 200 miles of shore and in waters shallower than 2000 meters deep. Many experiments have been conducted on ballast treatment technology with respect to the general disinfection of water. Systems varying from ultra violet light radiation and mechanical filtration to thermal/heat exposure have been thoroughly investigated.

Despite all the research conducted to date, little has been accomplished with the disinfection of ballast water. Ballast water disinfection methodologies are limited by general trade industry guidelines that must be followed in order for a product to be feasible in the commercial shipping industry.

One example of such a treatment is described in U.S. Pat. No. 5,816,181 which discloses a thermal treatment method for the treatment of ballast water; U.S. Pat. No. 4,384,943 discloses a method and apparatus for the electrochemical treatment of fluid; U.S. Pat. No. 6,125,778 discloses an ozone treatment method of ballast water; U.S. Pat. No. 5,804,065 discloses an electric shock apparatus for the control of zebra mussels; U.S. Pat. No. 5,871,623 discloses an electrochemical disinfection apparatus for the treatment of water; U.S. Pat. No. 5,932,112 discloses a method for the treatment of ballast water by oxygenating and deoxygenating water; and U.S. Pat. No. 4,292,175 discloses an apparatus for the electrochemical treatment of ship's black water.

SUMMARY OF THE INVENTION

The invention was developed to meet the need for treatment of ballast water in the shipping industry as well treatment of water generally to decontaminate polluted water. It is therefore one object of the invention to provide an improved ballast water treatment option/improvement.

It is another object of the invention to provide an improved electrode design to treat conductive water.

It is a further object of the invention to provide a method for applying an improved electrical wave pattern for aqueous disinfection.

It is yet another object of the invention to apply the methods and apparatus of the invention to the treatment of any form of contaminated water to reserve the water environmentally safe.

These example objectives of the invention are non-limiting and these and other objects will become evident from the following Brief Description of the Drawings and from the Description of the Preferred Embodiments provided herein below:

DETAILED DESCRIPTION OF THE PREFERRED EMBODIMENTS

The formation of hypochlorous acid (HClO) by the present invention, applied to ballast water (and other such contaminated water), is toxic to live ballast water organisms. According to one embodiment of the invention, ballast water treatment can be performed and also be economically feasible, safe to the ship and crew, and environmentally friendly. In other forms of the invention, the methods and apparatus can be applied to various types of polluted water having similar forms of unwanted contamination as is present in ballast water.

Figure 1:
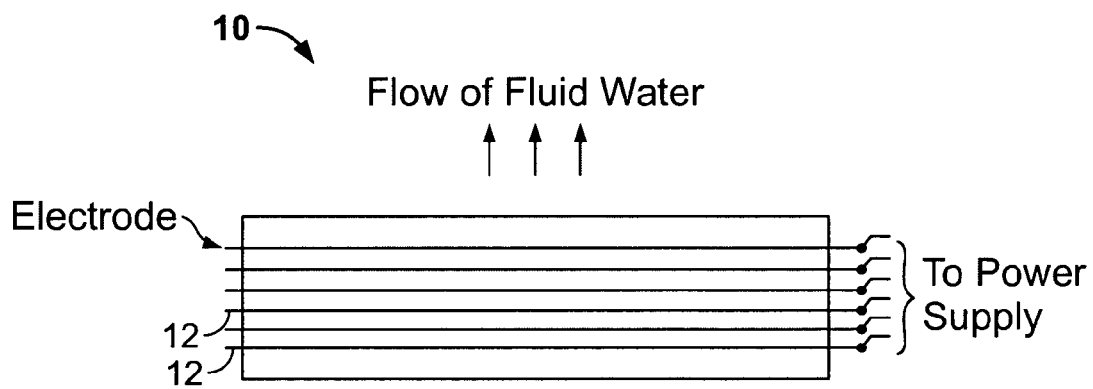
FIG. 1 is a cross-sectional view of the electrode arrangement and position within the invention.

As shown in FIG. 1, the preferred form of the invention includes an electrode array 10 such that the plurality of electrodes 12 are spaced in a series. The vertical position of the electrode array 10 directly exposes the passing organisms to the HClO formed during treatment. This positioning of the electrodes 12 ensures full water coverage over the electrodes 12 and the mixing of the anodic and cathodic chemicals formed during treatment. In addition, gravity is no longer a detracting feature because the vertical positioning creates a horizontal plane of hypochlorous acid during water treatment. Residence time of the water in the electrode array is also important to the formation of hypochlorous acid.

The preferred form of the invention provides the formation of HClO, and the following reactions occur in a saline solution at the anode of the electrodes 12:

$$2Cl^- \rightarrow Cl_2 + 2e^- \qquad (1)$$

$$2H_2O \rightarrow O_2 + 4H^+ + 4e^- \qquad (2)$$

In other forms of the invention, the reaction at the anode is not limited to Cl based constituents. For example, one can create hypobromous acid in the presence of bromine.

The anode has a positive charge; therefore, only chemical species with a negative or neutral charge will be local to the anode because like charges repel while opposite charges attract. As chemical species approach the anode, the electrostatic force between the negatively charged electrons of the chemical species and the anode increases. Chemical species local to the anode have a tendency of being oxidized. As a result, negatively charged species will become neutral and neutrally charged species will gain a net positive charge. The oxidation of water, for instance, requires the natural dissociation of one water molecule into one hydroxide ion (negative charge) and one hydrogen ion (positive charge). The hydroxide ion attacks a water molecule that subsequently yields hydrogen gas and a peroxide ion (negative charge). The peroxide ion spontaneously forms oxygen gas and a hydrogen anion. As the hydrogen anion is produced, it simultaneously binds to another hydrogen ion (produced during the initial dissociation of water), forming hydrogen gas. The hydrogen gas then undergoes reaction as shown in equation three recited above, which explains the four hydrogen ions in equation number two.

Ultimately, the most preferred lethal chemical species are $Cl_2$ and $HClO$ (equation 4). These reactions occur during the anodic half cycle of the electrode; and during the cathodic half cycle, $NaOH$ is formed. These two cycles alternate between electrodes, and this reversal of polarity helps provide a lethal chemical species in a zone that would ordinarily attract biofouling organisms.

As shown in FIG. 1, the electrodes are separated by nonconductive spacers to provide a void space between adjacent electrodes that covers substantially all of a major surface area of the electrodes to increase residence time of the untreated conductive water. The distance from one electrode to the next is a function of the desired residence time and total electrical resistance. As the distance between the electrodes is increased, residence time for organisms increases; but the resistance in the electrical circuit also increases. This is problematic because the total power needed would increase beyond feasible use. Maintaining a long enough residence time for disinfection to occur can be achieved by stacking multiple pairs of electrodes. This arrangement creates parallel resistors, which reduces the overall resistance; and thus the overall power needed is also reduced (as is the residence time).

Figure 2A:
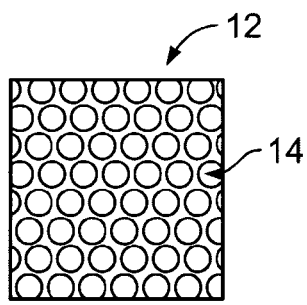
FIG. 2A is a view of the perforated plate electrode.
Figure 2B:
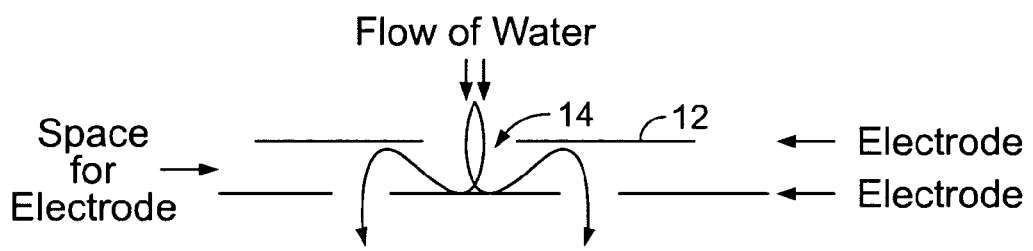
FIG. 2B is a detailed view of this invention's electrode arrangement.
Figure 2C:
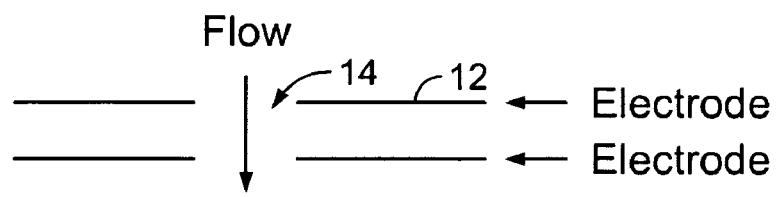
FIG. 2C is a detailed view of a non-effective electrode arrangement.

As shown in FIG. 2A for the most preferred embodiment, the electrode 12 has perforations 14 with approximately a 70% open area. The preferred pattern shown in FIG. 2A is advantageous to the electrode arrangement. The path of the water through the perforations 14 is important to the ability to complete disinfection across the electrode 12. As seen in the preferred embodiment of FIG. 2B, the water flow follows a serpentine path. In FIG. 2C, water flows directly through one perforation 14 to the next creating a tunnel effect, resulting in low disinfection. In the embodiment of FIG. 2B, the water flow is forced to come in contact with the electrode 12 for complete disinfection. The turbulent flow also ensures proper mixing of the water as it passes through the invention.

The invention can also include the attachment of a filtering device that may be useful to treat the aqueous solution (for example; for prevention of large suspended solids from being caught in the system and for chemical removal). Supplemental disinfection systems such as UV light treatment may also be included depending on the aqueous environments where the existing chemistry does not allow for desired disinfection rates.

Figure 3:
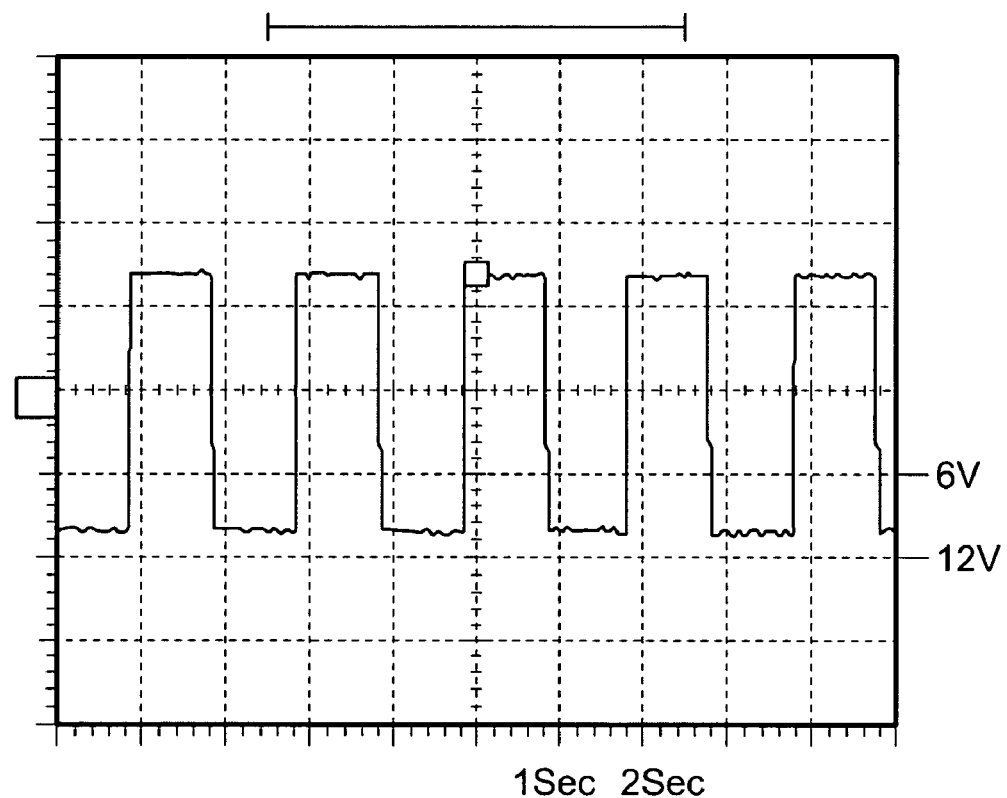
FIG. 3 is a drawing of the voltage waveform defined such that the current alternates and a high current limit is set so that the voltage is allowed to vary with changes in resistance.

In addition to electrode arrangement, a slow alternating current square wave applied to the electrodes 12 is able to prevent cathodic biofouling (see FIG. 3). A direct current (DC) can, in certain cases, result in problems with cathodic biofouling due to the accumulation of $NaOH$. The alternating current causes each electrode 12 to have a cathodic and anodic half cycle, which in turn interrupts the opportunity for fouling. This technique to increase the longevity of the electrodes 12 was first disclosed in U.S. Pat. No. 3,725,226, herein incorporated by reference.

The frequency of the slow alternating current (FIG. 3), which is used most preferably, ranges from 0.1 to 1 cycles per second. Cycles faster than 0.1 cycle per second generally do not allow enough time for the generation of a critical amount of $HClO$. Cycles slower than 1 per second generally cause irreversible cathodic biofouling. However, these less preferably ranges can still be useful in selected embodiments.

We have determined a current density range of 0.7 mA/cm2 to 20 mA/cm2 to be most effective at producing $HClO$ in concentrations high enough to sterilize the water. Higher current densities increase the effectiveness when the flow rate is increased. However, increasing the velocity has shown a decrease in performance at the same current density. The negative side effect of increasing the current density beyond the stated range was the production of free Chlorine and Hydrogen gas.

The invention has numerous uses such as for aquarium treatment, water reuse treatment, healthcare instrument disinfection, municipal and commercial wastewater and blackwater treatment, industrial water treatment (for example, intake cooling pipes at nuclear power plants), and the above described marine commercial and pleasure craft blackwater treatment.

Figure 4:
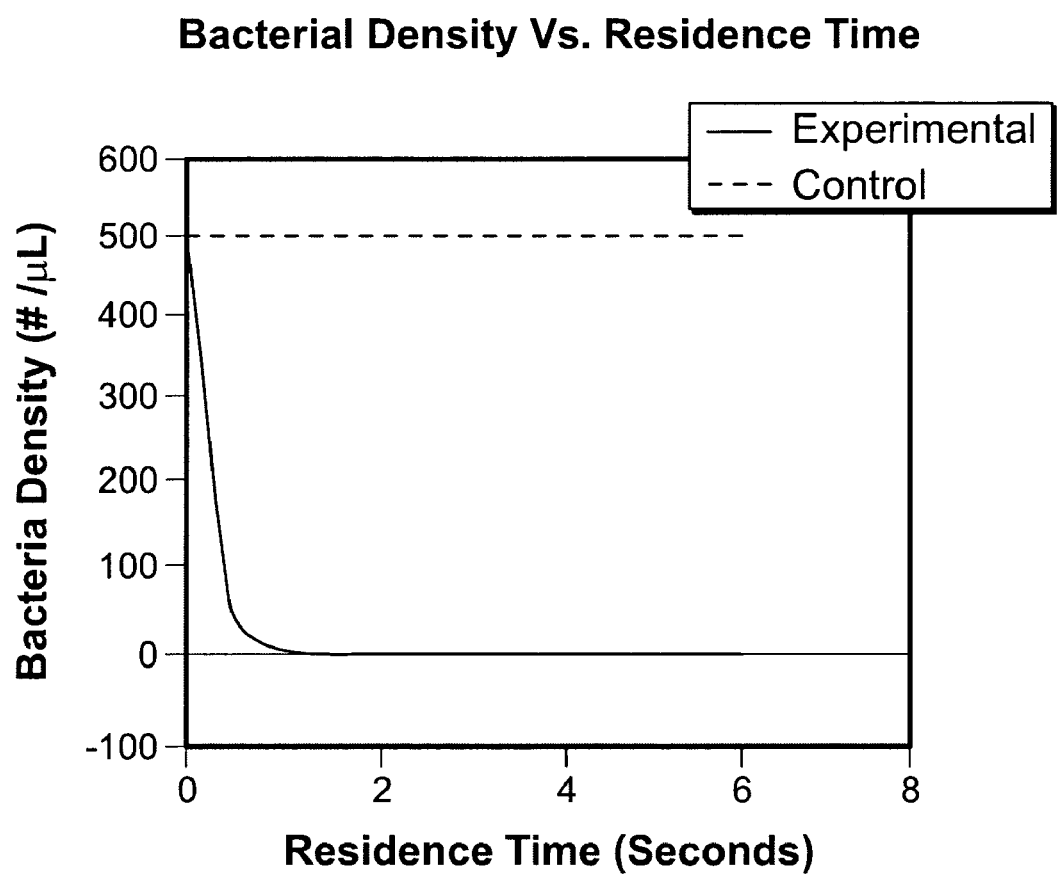
FIG. 4 illustrates residence time versus bacterial density for control and presence of hypochlorous acid.

Example tests were performed using brackish water (obtained from the Chesapeake Bay, Maryland). The tests measured bacteria densities of both the control and the treated water with the use of the invention. For all tests conducted; pH, conductivity, salinity, temperature, Chlorine concentration, and total dissolved solids of the water (pre and post treatment) were measured. There were no significant changes in overall water composition. The tests were run with residence times ranging from about 1 second to 6 seconds. Treated water had significantly fewer bacteria than the control (see FIG. 4).

EXAMPLE 1

|  | pH | Conductivity (mS) | Salinity (ppt) | T (° C.) | Chlorine Conc. (ppm) | Total Dissolved Solids (g/L) |
|---|---|---|---|---|---|---|
| Pre-treatment | 7.55 | 24.7 | 15.0 | 22.0 | 0.0 | 14.44 |
| Post-treatment | 7.59 | 24.7 | 15.0 | 22.0 | 0.4 | 14.45 |

The following example provides an illustration and the present invention is not limited to this example. Six electrodes are stacked to create three pairs of electrodes 12. The electrodes 12 are spaced ⅛ inch apart. This setup creates three parallel resistors as opposed to one resistor if only two of the electrodes 12 were to be used (water acts as the resistor). By having these parallel resistors, the resistance of the water is reduced to approximately one third of its original value according to Kirchoff's Law. This means that the electrical power required for only one pair of the electrodes 12 would be three times greater than in this current model according to Ohm's Law. A slow A.C. waveform is employed with a frequency of 1 Hz and a current limit of 0.75 amps. By setting the current limit such that the voltage would not peak at the defined voltage, the voltage may vary with slight resistance changes in the water. In this example, the voltage would be about 6 volts.

The Chesapeake Bay water is pumped from an untreated holding tank through the electrode array 10 into a clean tank. The flow rate of the water through the system is 8 liters per minute. Water samples are taken at various points along the transfer as well as throughout the duration of the transfer. Samples are cultured for evidence of living organisms and the result was a marked reduction in contaminating species.

While preferred embodiments have been illustrated and described, it should be understood that changes and modifications can be made therein in accordance with one of ordinary skills in the art without departing from the invention in its broader aspects.

What is claimed is:

1. A method of treating bulk quantities of water in a system to produce improved quality disinfected water, comprising the steps of:
   passing untreated conductive water into a treatment system comprised of an electrode array wherein the electrode array includes perforations oriented such that a substantial portion of the water being treated flows through the perforations and the electrode array comprised of stacked multiple pairs of electrodes with a void space between adjacent electrodes that covers substantially all of a major surface area of the electrodes to increase residence time of the untreated conductive water;
   applying an alternating electrical current to the electrode array;
   creating an acid within the treatment system by forming the acid in the untreated conductive water using the electrode array, the acid selected from the group consisting of hypochlorous acid and hypobromous acid; and
   the acid being created within the system disinfecting the untreated conductive water to create the improved quality water by virtue of the increased residence time of the untreated conductive water within the stacked multiple pairs of electrodes.

2. The method as defined in claim 1 wherein for the chemical reaction in which the acid is formed by the electrode array included is a halogen gas selected from the group consisting of $Cl_2$ and $Br_2$.

3. The method as defined in claim 1 further including the step of forming NaOH during a cathodic half cycle by the electrode array.

4. The method as defined in claim 1 wherein the electrode array is arranged to maintain adequate residence time for the untreated conductive water to achieve the improved quality water.

5. The method as defined in claim 4 wherein the electrode array comprises stacked multiple pairs of electrodes arranged in a geometry such that the substantial portion of the water being treated flows in a serpentine manner through the electrode array.

6. The method as defined in claim 5 wherein the stacked multiple pairs of electrodes include electrodes with perforations with about 70% open area for the electrodes.

7. The method as defined in claim 6 wherein the electrodes are arranged to create turbulent flow of the untreated conductive water through the perforations.

8. The method as defined in claim 4 wherein the electrode array is arranged substantially perpendicular to the flow of the water being treated.

9. The method as defined in claim 1 further including the step of performing a filtering step to remove unwanted solids.

10. The method as defined in claim 1 wherein the frequency of the alternating current wave is about 0.1–1.0 cycles per second.

11. A method of treating contaminated ship ballast water to provide biologically improved water, comprising the steps of:
    providing contaminated ship ballast water to a treatment system comprised of stacked multiple pairs of electrodes;
    applying a slowly alternating electrical current pattern having a frequency of about 0.1–1.0 cycles per second to the contaminated ship ballast water; and
    forming at least one of a hypochlorous and a hypobromous acid and also forming a salt hydroxide to decontaminate the contaminated ship ballast water.

12. A water system for treating contaminated water to produce improved quality water, comprising:
    an electrode array having perforation in each electrode and having stacked multiple pairs of the electrodes positioned to cause the contaminated water to flow substantially in a serpentine manner through the perforations which are staggered in each of the electrodes relative to the next perforation of the adjacent electrodes;
    a source of electrical power to apply current to the electrode array; and
    a supply of contaminated salt water providing chemical constituents selected from the group consisting of Na and a halogen.

13. The water system as defined in claim 12 wherein the electrode array comprises a structure designed to achieve adequate water residence time to decontaminate the water.

14. The water system as defined in claim 12 wherein the source of electrical power is programmed to apply a slow alternating wave pattern to the electrodes.

15. The water system as defined in claim 12 wherein the stacked multiple pairs of electrodes include electrodes with perforations with about 70% open area for the electrodes.

16. The water system as defined in claim 15 wherein the electrodes are arranged to create turbulent flow through the perforations.

17. The water system as defined in claim 12 further including a filter for removal of unwanted solids.

18. The water system as defined in claim 12 wherein the current has an alternating frequency of 0.1 to 1.0 cycles per second.

19. The water system as defined in claim 12 wherein the pair of electrodes are positioned substantially perpendicular to the flow of the contaminated water through the water system.

* * * * *